Dec. 23, 1930.    W. T. PALMER    1,786,082
HIGH THERMAL EFFICIENCY FURNACE
Filed Nov. 21, 1928

Inventor
Walter T. Palmer
By M. Talbert Lock
Attorney

Patented Dec. 23, 1930

1,786,082

UNITED STATES PATENT OFFICE

WALTER T. PALMER, OF DES MOINES, IOWA, ASSIGNOR OF ONE-HALF TO OLOF OLSON, OF DES MOINES, IOWA

HIGH-THERMAL-EFFICIENCY FURNACE

Application filed November 21, 1928. Serial No. 320,943.

The principal object of this invention is to provide a furnace of very high thermal efficency.

A further object of this invention is to provide a furnace capable of maintaining a very high constant temperature regardless of the thermal demand, thereby assuring not only uniform heat output, but making it possible to obtain complete combustion and utilization of all fuel units.

A still further object of my invention is to provide a furnace that delivers the heat units produced in the same, approximately as fast as they are produced.

A still further object is to obtain all the truant heat units that would otherwise be lost in the atmosphere surrounding the furnace or through the stack.

A still further object of my invention is to bring the temperature of the fluid returning from the radiation system to approximately that of the exhaust gases before the circulating fluid reaches the combustion chambers of the furnace.

A still further object of this invention is to provide a high thermal efficiency furnace that is of small compass, thereby eliminating the necessity of a large furnace room.

A still further object of this invention is to provide a furnace that washes the exhaust gases before the same are released to the outside atmosphere.

A still further object is to provide a furnace which is practically instantaneous in conformation to the heat demands of the system.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Figures 1, 2:
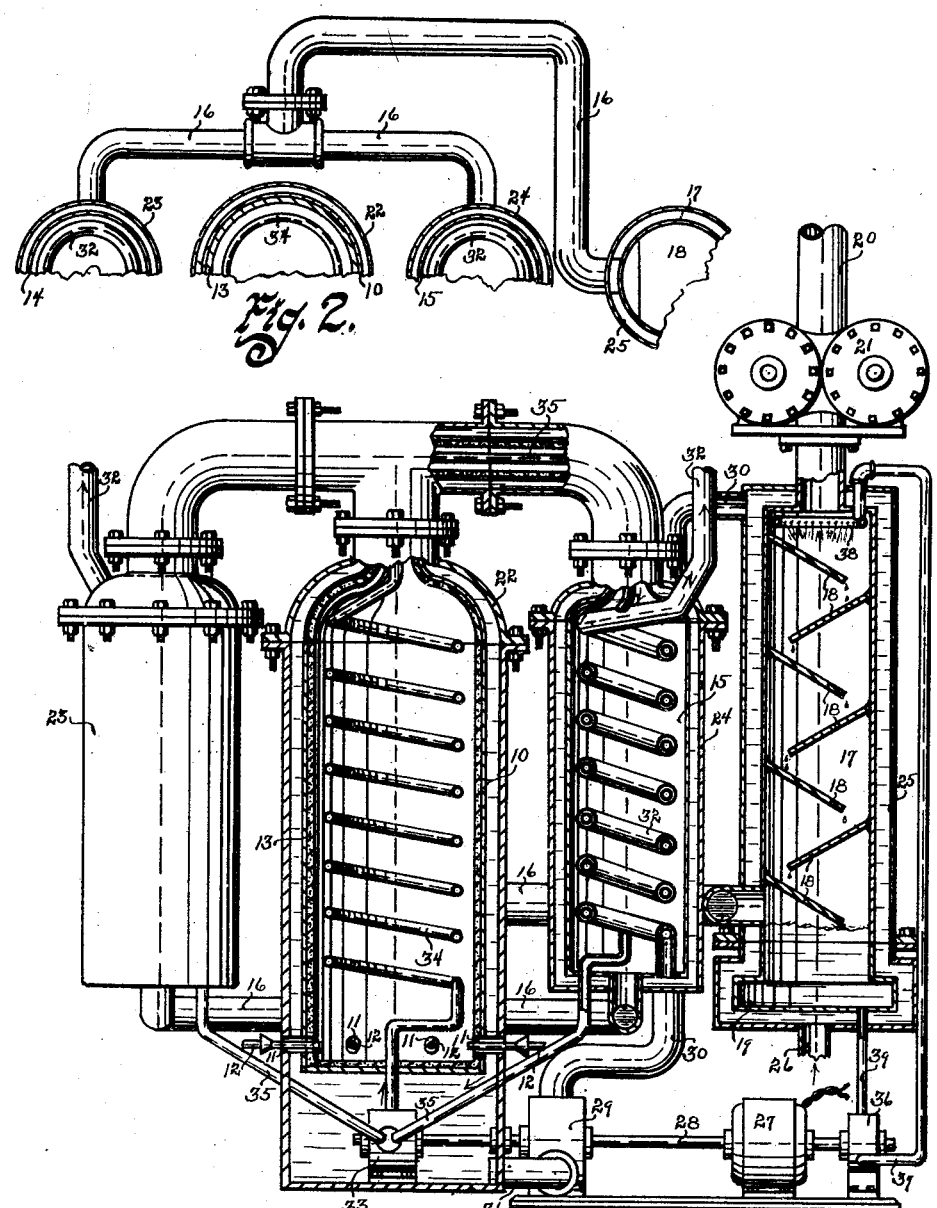
Fig. 1 is a side view of my complete invention with portions cut away to more fully illustrate its construction.
Fig. 2 is a top plan view of a portion of the invention and shows the necessary pipes for transferring the combustion gases from the secondary combustion chambers to the gas washer.

The ordinary furnaces now on the market are very low in thermal efficiency, due principally to the large combustion chamber and the permitted passing of the combustion gases possessing valuable heat units directly to the outside atmosphere where they are lost. Another disadvantage of the furnaces now on the market is their inability to instantly conform to the various heat demands that may be required of them. I have overcome all these disadvantages as will be appreciated by those skilled in the art.

I have used the numeral 10 to designate the first or primary combustion chamber having a plurality of air inlet openings 11 near its bottom. Extending into each of these openings is an ordinary fuel nozzle or jet 12, designed to be in communication with suitable fuel, such as lighting gas or oil. The numeral 13 designates a refractory lining adjacent the inner surface of the combustion chamber 10. Communicating by suitable fittings and located at each side of the combustion chamber 10 are the two secondary combustion chambers 14 and 15 respectively, as shown in Fig. 1. It will be noted that the points of communication in each instance is at the tops of the chambers, and that the heat produced in the bottom of the chamber 10 will pass upwardly and then downwardly in the chambers 14 and 15. From the bottoms of the secondary combustion chambers the exhaust gases carrying the remaining heat units pass through the pipes 16 and into the lower portion of the gas scrubber or washer, which is generally designated by the numeral 17. This scrubber or washer has a plurality of spaced apart, downwardly and inwardly extending baffle members 18 and a fluid reservoir 19 in its bottom. The numeral 20 designates a pipe having one of its ends leading from the top of the scrubber or washer 17 and designed to have its other end communicating with the outside atmosphere. Located in this pipe is an ordinary positive pressure exhauster 21, shown in conventional form for causing the combustion gases to pass upwardly in the primary combustion chamber, through the fittings and downwardly in the secondary combustion chambers, and then through the pipes 16 into the lower portion of the scrubber 17, from which the gases pass upwardly and out of the pipe 20 to the outside atmosphere.

Completely embracing and spaced apart from the primary combustion chamber, the secondary combustion chambers and the pipe fittings between the same is a water jacket as shown in Fig. 1. The water jacket around the primary chamber is designated by the numeral 22 and the jackets around the secondary chambers by the numerals 23 and 24 respectively. The numeral 25 designates a water jacket spaced apart from, and embracing the scrubbing chamber 17. Communicating with the bottom of the jacket 25 is the return pipe 26, designed to lead from a radiator or like. The numeral 27 designates a prime mover having the drive shaft 28. Operatively connected to the shaft 28 is an ordinary water or fluid pump 29. The numeral 30 designates a pipe leading from the top portion of the jacket 25 to the intake of the pump 29, and the numeral 31 designates a pipe leading from the exhaust end of the pump 29 to the bottom portion of the jacket 22. In each of the secondary combustion chambers, is a comparatively large helix tube 32, each communicating with the bottom portion of the jacket that surrounds its chamber and passing out of its chamber and the jacket near the top as shown in Fig. 1. These tubes 32 lead to a radiator or like having its return end in communication with the pipe 26. It will be noted that the jacket 22 is a considerable distance from the bottom of the primary chamber 10, and it is in this space I have provided a fluid pump 33 operatively connected to the shaft 28. Leading from the exhaust part of this pump is tube 34 constructed of heat resisting alloy. This tube extends into the primary combustion chamber and spirals upward near the refractory lining, and eventually communicates with the inside of the pipe 35. This pipe 35 extends from this point in both directions inside the fittings until it enters the two secondary combustion chambers respectively, where it enters the helix tubes 32 therein.

The pipe 35 is of much less diameter than the inside diameter of the tubes 32 and therefore a passage way on all sides of it is provided for the passage of water through the tubes. From the lower portions of the tubes 32 the pipe 35 passes and its two ends extend to and communicate with the inlet port of the pump 33. The fluid forced through the tube 34 and then through the pipe 35 by the pump 33 should be of a high boiling point and possess high thermal conductivity, such as metallic mercury, glycerine and the like. The numeral 36 designates a third pump operatively connected to the shaft 28 and has the outlet pipe 37 leading into the upper portion of the scrubber or washing chamber 17. Inside the chamber 17 and communicating with the pipe 37 is a spray ring 38. Leading from the reservoir 19 in the bottom of the chamber 17 and communicating at its other end to the return port of the pump 36 is the return pipe 39. When the water or the like is in the reservoir 19 and the device is operating, the same will be sprayed onto the baffle members 18.

By the above described arrangement the heat produced in the primary combustion chamber and not absorbed by the circulating fluid in the pipe 34 and the water or fluid around the chamber will pass upwardly and through the fittings into the secondary combustion chambers. From the top portion of the combustion chambers 14 and 15, the hot gases will pass downwardly losing almost all of their heat units by the same being absorbed by the water in the pipes 32 and around the two chambers. Then from the lower portions of the secondary chambers the gases will pass through the pipes 16 into the lower portion of the scrubber 17.

As the gas passes upwardly against and through the shower of water from the spray 38 and the baffles 18, they will lose what remaining heat units the gases possess by the same being absorbed by the water in the scrubber and around it. The movement of the gases is of course influenced by the exhauster 21, operated by a suitable prime mover, and as the gases leave the same they will be of very little temperature above the outside atmosphere, having lost approximately all their heat units in the device thereby realizing extraordinary high thermal efficiency.

The cool water returning from the radiator or like enters through the pipe 26 and passes up around the scrubber 17 and reservoir 19 where it is increased in temperature to approximately that of the gases as they pass through the scrubber. From the top of the jacket 25 the warmed water passes through the pipe 30 into the pump 29 which circulates the complete water system. Then from the pump 29 the water is forced in the jacket 22 and around the pump 33 and the primary combustion chamber where it absorbs great heat. From the upper portion of the jacket 22, the hot water passes around the gas fittings and into the spaces between the water jackets 23 and 24, and the secondary combustion chambers 14 and 15 respectively, where it absorbs additional heat units. Next the intensely heated water passes from the bottoms of the water jackets up into the tubes 32 where it absorbs additional heat units from the fluid passing through the pipe 35, in view of which when it passes out of the pipes 32 into the radiator or like, it will be of indeed high temperature. It will be appreciated that by scientific arrangement and jacketing, little if any truant heat is lost.

By the combustion chamber being very small, the circulating fluid of small quantity, and a very little loss of heat units through the stack, a furnace that is capable of practically instantaneous conformation of heat demands is obtained. If the speed of the motor is regulated relative to the heat demand a constant temperature is realized regardless of the changing heat demands. When the heat demand is very great, it is recommended that the radiator circulating fluid be of a high boiling point, such as glycerine.

Some changes may be made in the construction and arrangement of my improved high thermo efficiency furnace without departing from the real spirit and purpose of my invention and it is my intention to cover by my claims any modified forms of structure or use of equivalents which may be reasonably included within their scope.

I claim:

1. In a device of the class described, a primary combustion chamber, two secondary combustion chambers, pipes for passing gases from the top of said primary combustion chamber to the tops of said second combustion chambers, a means for producing hot gases at the lower portion of said first combustion chamber, a water jacket around each of said combustion chambers and said pipes and communicating with each other, a coiled pipe inside each of said second combustion chambers having one end communicating with the water jacket around that particular chamber and its other end designed to lead to a radiator system or like, a pump, a tube leading from the exhaust port of said pump into a coil inside said primary combustion chamber, a second tube communicating with the free end of said first tube extending in both directions and entering and passing into said two pipes from which it emerges and makes communication at both ends with the intake port of said pump; said pump designed to circulate a fluid through said tubes, and a second pump having its intake port in communication with the return pipe from the radiator system or like and its exhaust port in communication with the jacket around the primary combustion chamber.

2. In a device of the class described, a primary combustion chamber, two secondary combustion chambers, pipes for passing gases from the top of said primary combustion chamber to the tops of said second combustion chambers, a means for producing hot gases at the lower portion of said first combustion chamber, a water jacket around each of said combustion chambers and said pipes and communicating with each other, a coiled pipe inside each of said second combustion chambers having one end communicating with the water jacket around that particular chamber and its other end designed to lead to a radiator system or like, a pump inside the water jacket around said primary combustion chamber, a tube leading from the exhaust port of said pump into a coil inside said primary combustion chamber, a second tube communicating with the free end of said first tube extending in both directions and entering and passing into said two pipes from which it emerges and makes a communication at both ends with the intake port of said pump; said pump designed to circulate a fluid through said tubes, a second pump having its intake port in communication with the return pipe from the radiator system or like and its exhaust port in communication with the jacket around the primary combustion chamber, and a means for rotating said pump.

3. In a device of the class described, a primary combustion chamber, a secondary combustion chamber, a pipe for passing gases from the top of said primary combustion chamber to the top of said secondary combustion chamber, a means for producing hot gases at the lower portion of said first combustion chamber, a water jacket around each of said combustion chambers and said pipe and communicating with each other, a coiled pipe inside said second combustion chamber having one of its ends communicating with the water jacket around that particular chamber and its other end designed to lead to a radiator system or like, a pump, a tube leading from the exhaust port of said pump and formed into a coil inside said primary combustion chamber, and a second tube communicating with the free end of said first tube extending and passing into said coiled pipe from which it emerges and makes communication with the intake port of said pump; said pump designed to circulate a fluid through said tubes.

4. In a device of the class described, a primary combustion chamber, a secondary combustion chamber, a pipe for passing gases from the top of said primary combustion chamber to the top of said secondary combustion chamber, a means for producing hot gases at the lower portion of said first combustion chamber, a water jacket around each of said combustion chambers and said pipe and communicating with each other, a coiled pipe inside said secondary combustion chamber having one of its ends communicating with the water jacket around that particular chamber and its other end designed to lead to a radiator system or like, a pump, a tube leading from the exhaust port of said pump and formed into a coil inside said primary combustion chamber, a second tube communicating with the free end of said first tube extending and passing into said coiled pipe from which it emerges and makes communication with the intake port of said pump; said pump designed to circulate a fluid through said tubes, and a second pump having its intake port in communication with the return pipe from the radiator system or like and its exhaust port in communication with the inside of the water jacket around said primary combustion chamber.

5. In a device of the class described, a primary combustion chamber, a secondary combustion chamber, a pipe for passing gases from the top of said primary combustion chamber to the top of said secondary combustion chamber, a means for producing hot gases at the lower portion of said first combustion chamber, a water jacket around each of said combustion chambers and said pipe and communicating with each other, a coiled pipe inside said secondary combustion chamber having one of its ends communicating with the water jacket around that particular chamber and its other end designed to lead to a radiator system or like, a tube leading into and coiled inside said combustion chamber, and a second tube having one end communicating with the upper end of said first tube; extending to and passing into said coiled pipe from which it emerges and makes communication with the bottom end of said first mentioned tube.

6. In a device of the class described, a primary combustion chamber, a secondary combustion chamber, a pipe for passing gases from the top of said primary combustion chamber to the top of said secondary combustion chamber, a means for producing hot gases at the lower portion of said first combustion chamber, a water jacket around each of said combustion chambers and said pipe and communicating with each other, a coiled pipe inside said secondary combustion chamber having one of its ends communicating with the water jacket around that particular chamber and its other end designed to lead to a radiator system or like, a pump inside the water jacket around said primary combustion chamber, a means for rotating said pump, a tube leading from the exhaust port of said pump and formed into a coil inside said primary combustion chamber, and a second tube communicating with the free end of said first tube extending and passing into said coiled pipe from which it emerges and makes communication with the intake port of said pump; said pump designed to circulate a fluid through said tubes.

WALTER T. PALMER.